United States Patent [19]

Takeya

[11] Patent Number: 5,104,483
[45] Date of Patent: Apr. 14, 1992

[54] METHOD OF PRODUCING A NEGATIVE-PRESSURE TYPE MAGNETIC HEAD SLIDER

[75] Inventor: Fuminori Takeya, Nagoya, Japan

[73] Assignee: NGK Insulators, Ltd., Aichi, Japan

[21] Appl. No.: 672,331

[22] Filed: Mar. 20, 1991

Related U.S. Application Data

[62] Division of Ser. No. 462,224, Jan. 9, 1990, Pat. No. 5,019,930.

[30] Foreign Application Priority Data

Jan. 9, 1989 [JP] Japan ........................... 1-2373

[51] Int. Cl.⁵ ........................... B44C 1/22; C23F 1/00
[52] U.S. Cl. ........................... 156/647; 156/636; 156/645; 156/651; 156/659.1; 156/667
[58] Field of Search ........... 156/636, 645, 647, 651, 156/654, 659.1, 664, 667; 252/79.2; 29/603; 360/103, 105, 107, 109

[56] References Cited

U.S. PATENT DOCUMENTS

| | | | |
|---|---|---|---|
| 4,218,715 | 8/1980 | Garnier | 360/103 |
| 4,420,780 | 12/1983 | Deckert | 360/103 |
| 4,475,135 | 10/1984 | Warner et al. | 360/103 |
| 4,644,641 | 2/1987 | Verdone | 29/603 |
| 4,814,915 | 3/1989 | Wada et al. | 360/103 |
| 4,875,970 | 10/1989 | Takeya et al. | 156/645 |
| 4,878,004 | 11/1988 | Akiho et al. | 360/127 |

FOREIGN PATENT DOCUMENTS

| | | |
|---|---|---|
| A076361 | 4/1983 | European Pat. Off. . |
| 0142781 | 5/1984 | European Pat. Off. . |
| A148014 | 7/1985 | European Pat. Off. . |
| A336525 | 10/1989 | European Pat. Off. . |
| 53-74412 | 7/1978 | Japan .................. 29/603 |
| 54-23517 | 2/1979 | Japan . |
| 0151427 | 11/1979 | Japan .................. 29/603 |
| 56-7230 | 1/1981 | Japan . |
| 60-205879 | 10/1985 | Japan . |
| 60-229283 | 11/1985 | Japan . |
| 61-76689 | 4/1986 | Japan . |
| 62-14386 | 1/1987 | Japan . |
| 62-40604 | 2/1987 | Japan . |

Primary Examiner—William A. Powell
Attorney, Agent, or Firm—Parkhurst, Wendel & Rossi

[57] ABSTRACT

A magnetic head slider having an operating surface on which are formed a pair of air-bearing portions extending in a direction of flow of an air stream into a flying height between the head slider and a recording medium, a cross rail extending between the air-bearing portions, and a pressure-reducing portion formed between the air-bearing portions and downstream of the cross rail. The air-bearing portions, cross rail and pressure-reducing portions cooperate to maintain the amount of the flying height at an optimum value. The slider uses a ferrite single crystal which provides at least the operating surface and which have crystal faces oriented such that the (111) plane of the crystal is not a plane which is parallel to the extension of the downstream edge line of the cross rail, or such that the (111) plane is parallel to the extension of the downstream edge line of the cross rail and is inclined at an angle of at least 60° with respect to the operating surface. The operating surface is formed by chemical etching through an etching mask, by using an aqueous phosphoric acid solution.

8 Claims, 9 Drawing Sheets

METHOD OF PRODUCING A NEGATIVE-PRESSURE TYPE MAGNETIC HEAD SLIDER

This is a division of application Ser. No. 07/462,224 filed Jan. 9, 1990, now U.S. Pat. No. 5,019,930.

BACKGROUND OF THE INVENTION

1. Field of the Invention

The present invention relates to a structure of a magnetic head slider and a method for producing such magnetic head slider, and more particularly to improvements in a negative-pressure type magnetic head slider suitable for a magnetic disk drive capable of high-density recording, and improvements in the method of production of such negative-pressure type magnetic head slider.

2. Discussion of the Prior Art

In a rigid magnetic disk drive (RDD), a magnetic head is formed integrally with a slider which is adapted to be held apart from a rotating magnetic disk, by a suitable small distance, so that the magnetic head is operable to record and reproduce (write and read) information on and from the magnetic disk while the magnetic head maintains a suitable flying height or air bearing clearance or gap of about 0.2–0.3 μm with respect to the disk surface. The rigid magnetic disk drive is widely used as an external storage device for a computer, owing to relatively high density of recording per unit area of the magnetic disk, comparatively short access time, and considerably high rate of transfer of information. To further improve the recording density of a magnetic disk used in the rigid magnetic disk drive, there are growing requirements for reducing a flying height between the head slider and the magnetic disk surface, and increasing the stability of maintaining the clearance at a constant value. In an attempt to satisfy these requirements, extensive studies and research have been made to provide a negative-pressure type magnetic head slider which has a high degree of air-bearing stability, i.e., constant amount of flying height between the head slider and the magnetic disk surface.

An example of such negative-pressure type magnetic head slider is indicated generally at 7 in FIGS. 1 and 2. The magnetic head slider 7 has a configuration as shown in FIG. 1, and is operated in a posture as indicated in FIG. 2 with respect to a magnetic recording medium in the form of a magnetic disk 8, on and from which information is written or read by the magnetic head. Namely, the information writing and reading operations are effected while an air stream exists between the surface of the magnetic disk 8 and the operating surface of the head slider which faces the disk 8.

Described more specifically, the operating surface of the magnetic head slider 7 which faces the magnetic disk 8 has a pair of parallel spaced-apart air-bearing portions 1, 1, a cross rail 2, a pressure-reducing or sucking portion 3, and an inclined portion 4 (which may be replaced by a stepped portion 4). The inclined portion 4 is provided at one end of the head slider 7, for positively or effectively introducing an air stream caused by the rotation of the magnetic disk 8, into the space between the disk 8 and the operating surface of the slider 7. The inclined portion 4 terminates in the cross rail 2 in the direction of flow of the air stream, and the cross rail 2 connects the spaced-apart air-bearing portions 1, 1 at the ends on the side of the inclined portion 4. The air-bearing portions 1, 1 have a generally rectangular shape and function to maintain the head slider 7 in the floating posture by the air stream flowing between the air-bearing surfaces 1, 1 and the surface of the disk 8. The cross rail 2 functions to reduce the amount of flow of the air downstream. The sucking portion 3 is defined by the cross rail 2 and the air-bearing portions 1, 1, such that the portion 3 is formed between the two air-bearing portions 1 and the upstream end of the portion 3 is defined by the cross rail 2. The sucking portion 3 functions to produce an air suction of the head slider 7 toward the magnetic disk 8. Thus, the air-bearing portions 1, 1 and the sucking portion 3 cooperate to maintain the flying height through which the air flows during rotation of the magnetic disk 8.

The sucking portion 3 is defined by a rectangular groove having a depth of about 2–10 μm as measured from the air-bearing surfaces 1, 1. The material and structural requirements of the magnetic head slider 7 do not permit this groove 3 to be formed by a machining operation. Usually, the groove is formed in an ion etching process, as disclosed in laid-open Publication Nos. 62-14386 and 62-40604 of Japanese Patent Applications.

However, the ion etching process suffers from some drawbacks when the magnetic head slider 7 is formed of a ferrite polycrystal. That is, the etching speed is as low as 0.02–0.03 μm/min, taking about one hour or more to form the groove 3, where the argon ion etching is employed, for example. Further, the ion etching process requires a mask for covering the air-bearing portions 1 and the cross rail 2. The mask should be formed of a material which is etched at a lower rate than the ferrite used for the head slider. Alternatively, the mask should have a considerably large thickness.

A known method of producing a negative-pressure type magnetic head slider is illustrated in FIGS. 3(a) through 3(g). Initially, a ferrite block is mirror-polished as indicated in FIG. 3(a). One of opposite major surfaces of the ferrite block is covered by a sputtered metallic masking material such as Cr and Ti, whose etching speed is about one-fourth of that of the ferrite material, as indicated in FIG. 3(b). The metallic masking material is patterned into an etching mask, by photolithography as indicated in FIG. 3(c) and by etching as indicated in FIG. 3(d). Thus, the process to form the etching mask is rather complicated. Where a ferrite polycrystal is used for the magnetic head slider, an ion etching process is used for forming the pressure-reducing portion, as indicated in FIG. 3(e). In this case, the surface roughness of the formed pressure-reducing portion amounts to as high an Rmax as 0.6 μm. If the depth of the groove for the pressure-reducing portion is small, the roughness of the pressure-reducing surface adversely affects the stability in maintaining a desired amount of flying height between the head slider and the magnetic disk surface.

After the pressure-reducing portion is formed by etching through the metallic mask, the mask is removed as indicated in FIG. 3(f). Finally, the inclined (or stepped) portion is formed adjacent to the cross rail at one end of the pressure-reducing portion.

Another problem is encountered in the process of FIG. 3, when the metallic mask is formed by photolithography and etching as indicated in FIGS. 3(c) and 3(d). Namely, the dimensions of the metallic mask cannot be accurately controlled. In particular, the width accuracy of each air-bearing portion or surface 1 which influences the amount of flying height of the head slider must be held to within a range of ±10 μm.

An alternative method of producing the negative-pressure type magnetic head slider is disclosed in laid-open Publication Nos. 60-229283 and 61-76689 of Japanese Patent Applications. This method includes a step of irradiating a ferrite block with a laser radiation, while the ferrite block is submerged in an etching liquid. Although this step is simpler than the ion etching step, the method in question suffers from a considerably low production efficiency and cannot be practiced on an industrially justifiable basis.

SUMMARY OF THE INVENTION

It is therefore a first object of the present invention to provide a negative-pressure type magnetic head slider which is economical to manufacture without using an ion etching process and which is excellent in the stability of maintaining a desired flying height with respect to the surface of a magnetic recording medium.

A second object of the invention is to provide a method suitable for producing the negative-pressure type magnetic head slider as described above.

The first object may be attained according to one aspect of the present invention, which provides a negative-pressure type magnetic head slider, having an operating surface which faces a surface of a magnetic recording medium, and on which are formed an inclined or stepped portion for introducing an air stream into an air-bearing clearance between the operating surface of the slider and the surface of the recording medium, a pair of mutually spaced-apart parallel air-bearing portions extending in a direction of flow of the air stream and functioning to cause the air stream to hold the head slider away from the surface of the recording medium, a cross rail extending between the air-bearing portions and functioning to reduce an amount of flow of the air stream, and a pressure-reducing portion formed between the air-bearing portions and downstream of the cross rail in the direction of flow of the air stream and cooperating with the cross rail to function to reduce a pressure of the air stream for thereby causing the head slider to be attracted toward the surface of the recording medium, wherein the improvement comprises a ferrite single crystal which provides at least the operating surface. The single crystal has crystal faces which are oriented such that the (111) plane of the ferrite single crystal is a plane other than a plane which is parallel to the extension of the downstream edge line of the cross rail, or such that the (111) plane is parallel to the extension of the downstream edge line of the cross rail and is inclined at an angle of at least 60° with respect to the operating surface.

Preferably, the crystal faces of the ferrite single crystal are oriented such that a combination of a first plane parallel to the operating surface, a second plane parallel to the extension of the air-bearing portions and perpendicular to the operating surface, and a third plane parallel to the extension of the downstream edge line of the cross rail and perpendicular to the operating surface is selected from the following six combinations: (211), (110) and (111); (311), (110) and (332); (110), (111) and (211); (110), (211) and (111); (100), (100) and (100); and (210), (100) and (210).

The second object may be achieved according to another aspect of the present invention, which provides a method of producing a negative-pressure type magnetic head slider having an operating surface which faces a surface of a magnetic recording medium, and on which are formed an inclined or stepped portion of introducing an air stream into a flying height or air-bearing clearance between the operating surface of the slider and the surface of the recording medium, a pair of mutually spaced-apart parallel air-bearing portions extending in a direction of flow of the air stream and functioning to cause the air stream to hold the head slider away from the surface of the recording medium, a cross rail extending between the air-bearing portions and functioning to reduce an amount of flow of the air stream, and a pressure-reducing portion formed between the air-bearing portions and downstream of the cross rail in the direction of flow of the air stream and cooperating with the cross rail to function to reduce a pressure of the air stream for thereby causing the head slider to be attracted toward the surface of the recording medium. The present method comprising the steps of: preparing a ferrite single crystal which provides at least the operating surface of the magnetic head slider; forming an etching mask on an etching surface of the ferrite single crystal, the etching mask including a first portion and second portions which cover respective portions of the etching surface which correspond to the cross rail and the air-bearing portions, respectively, the etching surface being selected and crystal faces of the ferrite single crystal being determined such that the (111) plane of the ferrite single crystal is a plane other than a plane which is parallel to the extension of the downstream edge line of the first portion of the etching mask, or such that the (111) plane is parallel to the extension of the downsteam edge line of the first portion of the etching mask and is inclined at an angle of at least 60° with respect to the operating surface; and chemically etching the etching surface of the ferrite single crystal in an aqueous acid solution containing phosphoric acid as a major acid component, to thereby form the operating surface of the magnetic head slider which has at least the air-bearing portions, the cross rail and the pressure-reducing portion. Each of the air-bearing portions and the cross rail have two inclined shoulder surfaces which define a width thereof.

It is preferable that the crystal faces of the ferrite single crystal is determined such that a combination of a first plane parallel to the etching surface, a second plane parallel to the extension of the downstream edge line of the second portions of the etching mask and perpendicular to the etching surface, and a third plane parallel to the extension of the downstream edge line of the first portion of the etching mask and perpendicular to the etching surface is selected from the following six combinations: (211), (110) and (111); (311), (110) and (332); (110), (111) and (211); (110), (211) and (111); (100), (100) and (100); and (210), (100) and (210).

BRIEF DESCRIPTION OF THE DRAWINGS

The above and optional objects, features and advantages of the present invention will become more apparent by reading the following detailed description of the invention, when considered in connection with the accompanying drawings, in which.

DETAILED DESCRIPTION OF THE INVENTION

The negative-pressure type magnetic head slider according to the present invention is formed from a ferrite block which consists of a ferrite single crystal or includes a single crystal ferrite portion (where the ferrite block also includes a polycrystal ferrite portion). The ferrite single crystal or single crystal ferrite portion may be formed of a magnetic ferrite material such as Mn-Zn ferrite or Ni-Zn ferrite, or alternatively a non-magnetic ferrite material such as Zn ferrite. In any case, the crystal faces of the ferrite single crystal (single crystal of the single crystal ferrite portion) should be oriented such that the (111) plane of the single crystal is not a plane which is parallel to the extension of the downstream edge line of the cross rail. Alternatively, the crystallographic orientation should be determined such that the (111) plane is parallel to the extension of the downstream edge line of the cross rail and is inclined at an angle of 60° or more relative to the operating surface of the head slider. It is particularly preferable that the ferrite single crystal is oriented such that the plane parallel to the operating surface of the head slider, the plane which is parallel to the extension of the downstream edge line of the air-bearing portions (parallel to the direction of flow of the air stream) and which is perpendicular to the operating surface, and the plane which is parallel to the extension of the downstream edge line of the cross rail and which is perpendicular to the operating surface, consist of respective three planes which are selected from one of the following six combinations: (211), (110) and (111); (311), (110) and (332); (110), (111) and (211); (110), (211) and (111); (100), (100) and (100); and (210), (100) and (210).

The etching of a ferrite single crystal according to the method of the present invention utilizes an aqueous solution of an acid solute whose major portion consists of phosphoric acid. This acid solution exhibits anisotropy of the etching speed depending upon the etching directions along the axes of the ferrite single crystal. According to the present method using the phosphoric acid solution for etching the ferrite of the magnetic head slider, the entirety of the head slider need not be constituted by a ferrite single crystal. In other words, the present method permits the use of a composite ferrite material consisting of a polycrystal ferrite portion and a single crystal ferrite portion which are joined together such that the ferrite single crystal provides at least a sliding surface of the head slider which faces the surface of a magnetic recording medium such as a magnetic disk during operation of the magnetic head.

Figure 4A:
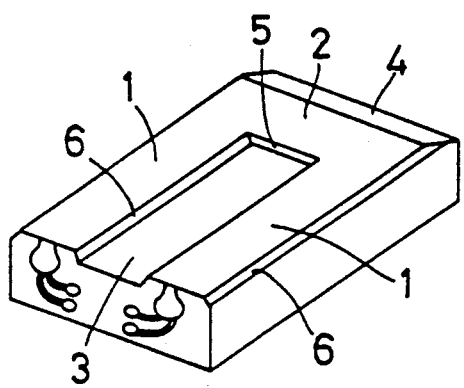
FIGS. 4(a) and 4(b) are perspective views showing other forms of the magnetic head slider according to the present invention.
Figure 4B:
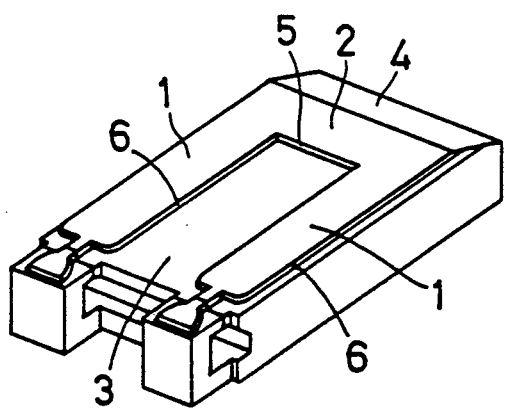

The principle of the present invention is applicable not only to a thin-film type magnetic head slider as shown in FIG. 4(a) which has a magnetic circuit formed by photolithography and sputtering, but also to a bulk type magnetic head slider as shown in FIG. 4(b) which is formed from two ferrite bars which have coil-winding grooves and are joined together by means of a non-magnetic magnetic gap portion.

Figure 1:
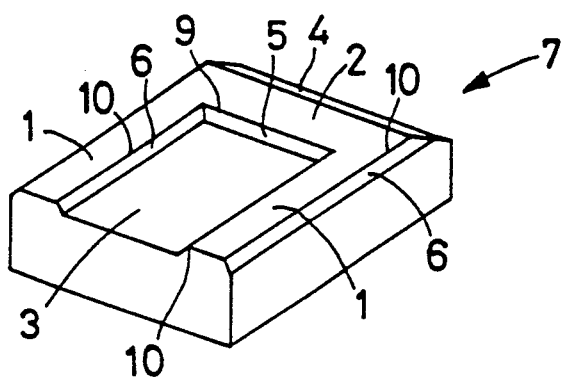
FIG. 1 is a perspective view of one form of a negative-pressure type magnetic head slider to which the principle of the present invention is applicable.
Figure 2:
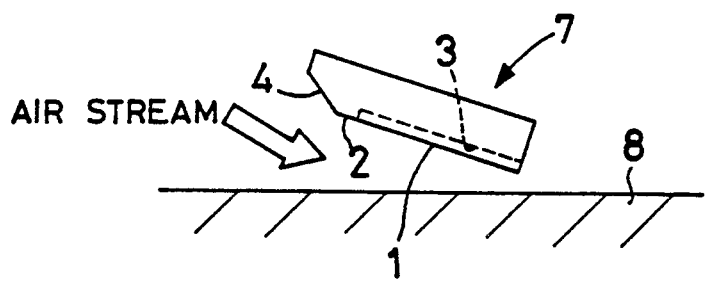
FIG. 2 is an elevational view of the magnetic head slider in its operating position.
Figure 3:
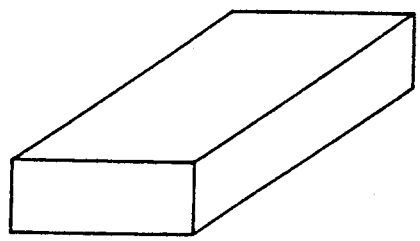
FIGS. 3(a) through 3(g) are views explaining process steps implemented in one example of a known method of producing a negative-pressure type magnetic head slider.
Figure 3:
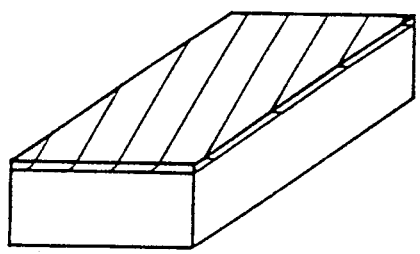
Figure 3:
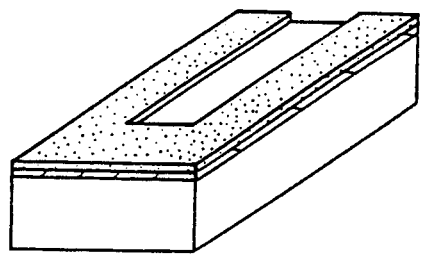
Figure 3:
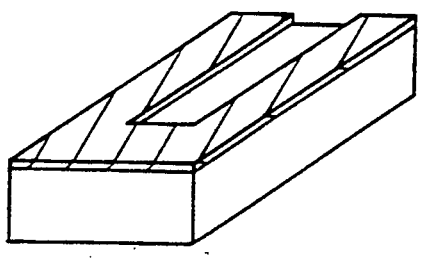
Figure 3E:
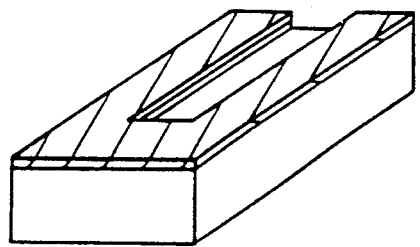
Figure 3F:
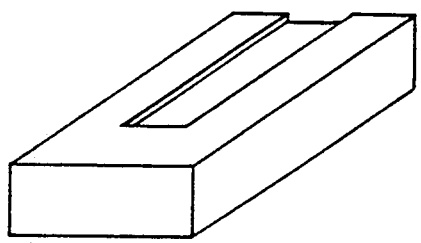
Figure 3G:
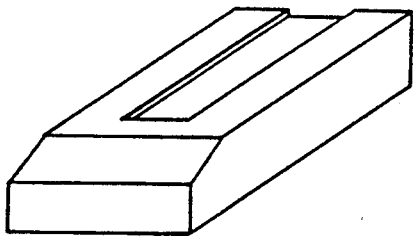

An important structural requirement of a negative-pressure type magnetic head slider as shown in FIG. 1 relates to the angle of inclination of a shoulder surface 5 between the surface of the cross rail 2 and the surface of the pressure-reducing portion 3. Namely, it is required that the angle of the shoulder surface 5 to the surfaces of the cross rail 2 and pressure-reducing portion 3 be as close to 90° as possible. If the inclination angle of the shoulder surface 5 is small, the effect of the pressure-reducing portion 3 to reduce the pressure in the air-bearing clearance (flying height) and thereby move the head slider 7 toward the magnetic disk 8 (FIG. 2) under suction is not sufficient. In this case, the amount of air-bearing clearance between the head slider 7 and the magnetic disk 8 is excessively, particularly when the peripheral speed of the rotating disk 8 is high. Therefore, the shoulder surface 5 whose inclination angle to the pressure-reducing portion 3 is small makes it difficult to maintain the desired amount of clearance between the head slider 7 and the magnetic disk 8. In this respect, the angle of inclination of the shoulder surface 5 is desirably at least 60°, so that the flying height may be maintained stably at an optimum value when the peripheral speed of the magnetic disk 8 is higher than a certain level.

According to the present invention, the negative-pressure type magnetic head slider 7 of FIG. 1 is fabricated such that at least the operating surface or sliding surface (including the surfaces 1-3) of the head slider 7 which faces the recording medium is provided by a ferrite single crystal. The crystal faces of this ferrite single crystal are determined such that the plane (111) of the crystal is not a plane which is parallel to an edge line 9 of the cross rail 2 (which separates the top surface of the rail 2 from the shoulder surface 5). Alternatively, the crystal faces are determined such that the (111) plane is parallel to the edge line 9 and is inclined at an angle of 60° or more with respect to the operating surface (1-3). The cross rail, air-bearing portions and pressure-reducing portion of the head slider are formed by chemically etching a surface of the ferrite single crystal, through an etching mask applied to the etching surface. The etching mask includes a first portion covering a portion of the etching surface corresponding to the cross rail, and second portions which cover respective portions of the etching surface corresponding to the air-bearing portions. The etching surface is selected and the crystal faces of the ferrite single crystal are oriented such that the (111) plane is not a plane which is parallel to the extension of the downstream edge line of the first portion of the etching mask, or alternatively such that the (111) plane is parallel to the extension of the downstream edge line of the first portion of the etching mask and is inclined at an angle of at least 60° with respect to the etching surface. The etching surface is chemically etched in an aqueous acid solution containing phosphoric acid as a major acid component, to thereby form the operating surface of the head slider. Each of the air-bearing portions and the cross rail has two inclined shoulder surfaces defining its width.

Generally, a ferrite single crystal has a cubic system, and the etching speed or rate of the crystal in the direction perpendicular to the crystal plane (111) is the lowest, for example, within a range of ⅕ to ¼ of the etching speed in the other directions. Where the desired angle $\theta$ of inclination of a surface to be formed by etching is 60° or more, as indicated in FIG. 5(b), the crystal faces of the ferrite single crystal should be determined such that the (111) plane which is parallel to a plane including an edge line 12 of an etching mask 11 is inclined at an angle of at least 60° with respect to an etching surface F of the ferrite single crystal. Regarding the crystal faces of the ferrite single crystal, however, all of eight equivalent planes (111), ($\bar{1}$11), (1$\bar{1}$1), (11$\bar{1}$), ($\bar{1}\bar{1}$1), ($\bar{1}$1$\bar{1}$), (1$\bar{1}\bar{1}$) and ($\bar{1}\bar{1}\bar{1}$) should be taken into consideration. The inclination angle $\theta$ may also be made 60° or more, even if the crystal faces of the ferrite single crystal are determined such that there are no such (111) planes parallel to the edge line 12 of the etching mask 11. The crystal faces as described above make it possible to reduce a side etching width W in the direction parallel to the etching mask 11 (perpendicular to the direction in which the surface F is etched to a depth D). See FIG. 5(a). Thus, the etching of the ferrite single crystal oriented according to the principle of the present invention assures improved dimensional accuracy of the head slider 7.

According to the present method, the pair of parallel air-bearing portions 1, 1 each having a suitable width are formed by chemical etching, usually, concurrently with the cross rail 2 and pressure-reducing portion 3. That is, shoulder surfaces 6 defining the width of each air-bearing portion 1 are formed by chemical etching. For effective development of a suction force by the pressure-reducing portion 3, the angle of inclination of the shoulder surfaces 6 is preferably 45° or more. Further, the two shoulder surfaces 6 of each air-bearing portion 1 are desirably formed symmetrically with each other with respect to a centerline extending in the longitudinal direction of the portion 1, so that the air-bearing portions 1, 1 have increased stability of receiving an air stream for holding the head slider 7 away from the magnetic disk 8 so as to maintain the desired amount of flying height.

Described more specifically, the accuracy of the widths of the air-bearing portions 1 which determine the areas of the top surfaces of the portions 1 is important to determine the force by which the air stream impinging upon the air-bearing portions 1 pushes up the head slider 7 to provide a flying height with respect to the surface of the magnetic disk 8. For controlling the amount of the flying height with sufficiently high accuracy, the error in the widths of the air-bearing portions 1 should be held to within ±10 μm. In the case of the bulk type air-suction magnetic head slider as shown in FIG. 4(b), the tracks of the magnetic head are desirably formed concurrently with the cross rail 2, pressure-reducing portion 3 and air-bearing portions 1, in order to simplify the process of fabrication of the head slider. In this case, the tolerance of the width of each air-bearing portion 1 is ±1 μm, i.e., the tolerance of the track width.

The surface roughness of the pressure-reducing portion 3 is also an important factor which influences the floating stability of the negative-pressure type magnetic head slider 7. That is, if the surface of the pressure-reducing portion 3 is not sufficiently smooth, the surface tends to cause turbulence of the air stream, which reduces the floating stability of the head slider 7, resulting in fluctuation of the flying height. In this respect, the surface roughness of the pressure-reducing portion 3 is preferably Rmax 0.1 μm or less.

In view of the factors described above, the crystal faces of the ferrite single crystal providing the sliding or operating surface (1-3) of the magnetic head slider 7 are preferably determined such that a first plane parallel to the operating surface, a second plane which includes an edge line 10 of the air-bearing portion 1 (parallel to the direction of flow of the air stream) and which is perpendicular to the operating surface, and a third plane which includes an inner or downstream edge line 9 of the cross rail 2 and which is perpendicular to the sliding surface, consist of respective three planes selected from the following six combinations: (211), (110) and (111); (311), (110) and (332); (110), (111) and (211); (110), (211) and (111); (100), (100) and (100); and (210), (100) and (210). Accordingly, the method of producing the magnetic head slider 7 according to the present invention is preferably adapted so that the crystal faces of the ferrite single crystal are oriented such that a first plane of the crystal parallel to the etching surface (which gives the operating surface of the head slider), a second plane of the crystal which includes an edge line of the etching mask defining the edge line 10 of the air-bearing portion 1 which is perpendicular to the etching surface, and a third plane of the crystal which includes an edge line of the etching mask defining the inner or downstream edge line 9 of the cross rail 2 and which is perpendicular to the etching surface, consist of respective three planes which are selected from the six combinations of planes indicated above.

Figure 5A:
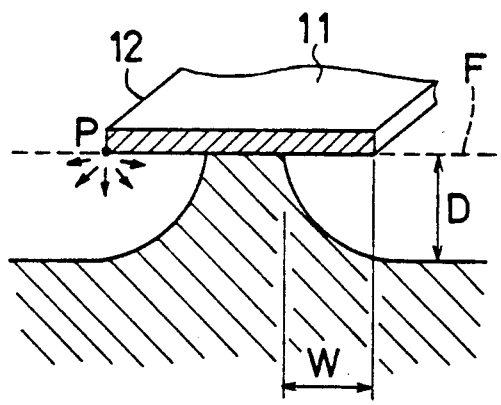
FIGS. 5(a) and 5(b) are illustrations explaining a known chemical etching process and a chemical etching according to the present invention, respectively.
Figure 5B:
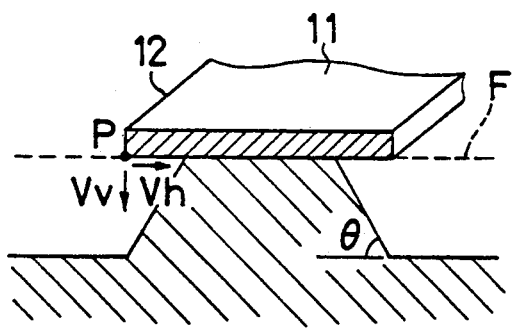

Referring to FIG. 5(a) showing an ordinary chemical etching process in which the etching rate or speed is the same for all directions as viewed from a given point P on the edge 12 of the etching mask 12, whereby the workpiece is etched so as to form a circular arc surface whose center is located at point P. In this case, the etched surface has a comparatively large inclination angle with respect to the plane of the mask 11, i.e., has a relatively steep slope. However, the side etching amount W in the direction parallel to the plane of the etching mask 11 is equal to the etching depth D in the direction perpendicular to the plane of the etching mask 11 (etched surface F). That is, the amount of etching under the mask 11 increases with the etching depth D. Therefore, the accuracy with which the side etching amount W is controlled by the width of the etching mask 11 is lowered as the etching depth D increases. A typical isotropic etching method as described above is an electrolytic etching process. In this electrolytic etching process, it is very difficult to control the potential distribution for accurately controlling the dimensions D and W indicated above.

In the chemical etching process according to the present invention which uses an aqueous etching solution containing an acid solute whose major portion consists of phosphoric acid, the etching speed of the ferrite single crystal in one direction differs from that in the other direction. In this anisotropic etching process according to the invention as illustrated in FIG. 5(b), the etching speed Vv in the direction perpendicular to the plane of the etching mask 11 is higher than the etching speed Vh in the direction parallel to the plane of the mask 11. In this case, the etched surface of the ferrite single crystal which is provided inside and under the point P on the edge 12 of the mask 11 has an angle of inclination $\theta$ of 60° or more, with the side etching amount W considerably reduced as compared with that in FIG. 5(a). Thus, the anisotropic etching according to the invention provides improved dimensional accuracy of the etched surfaces.

In the present invention, the surface F of the ferrite block to be etched to give the sliding surface of the magnetic head slider is provided by the ferrite single crystal. Therefore, the etched surface does not suffer from a low degree of smoothness as encountered on a conventionally used ferrite polycrystal. According to the present method, the roughness of the etched surface may be held to within and Rmax of 0.1 μm.

It is noted that the roughness of the etched surface (F) parallel to the plane of the mask 11 means the surface roughness of the pressure-reducing portion 3 of the produced magnetic head slider 7. In this respect, it is desirable to mirror-polish the corresponding surface of the ferrite single crystal as with a diamond abrasive, before the surface is etched.

For improved adhesion of the etching mask 11 to the non-etched surface of the ferrite single crystal, the surface of the ferrite single crystal to be etched is preferably subjected to one or more preliminary treatments prior to applying the etching mask to the ferrite single crystal. The preliminary treatments include: a surface treatment by using an aqueous solution of an amine compound (e.g., alkanol amine) whose concentration is not higher than 50%; an etching treatment to a depth of at least 10 angstroms by an acid solution such as a phosphoric acid solution; and an annealing treatment by heating the ferrite to about 400° C. in an inert gas such as $N_2$ gas. The adhesion of the etching mask 11 is important, since it affects the accuracy of the widths of the air-bearing portions 1 and tracks which are formed by etching through the mask.

The etching mask 11 is then formed on the thus treated surface of the ferrite single crystal, in a desired pattern, by a suitable known method such as a screen-printing technique, which is selected depending upon the required patterning accuracy and from the standpoint of economy. For high accuracy and ease of patterning of the mask 11, it is preferable to use a photolithographic method using a photoresist.

Figure 6:
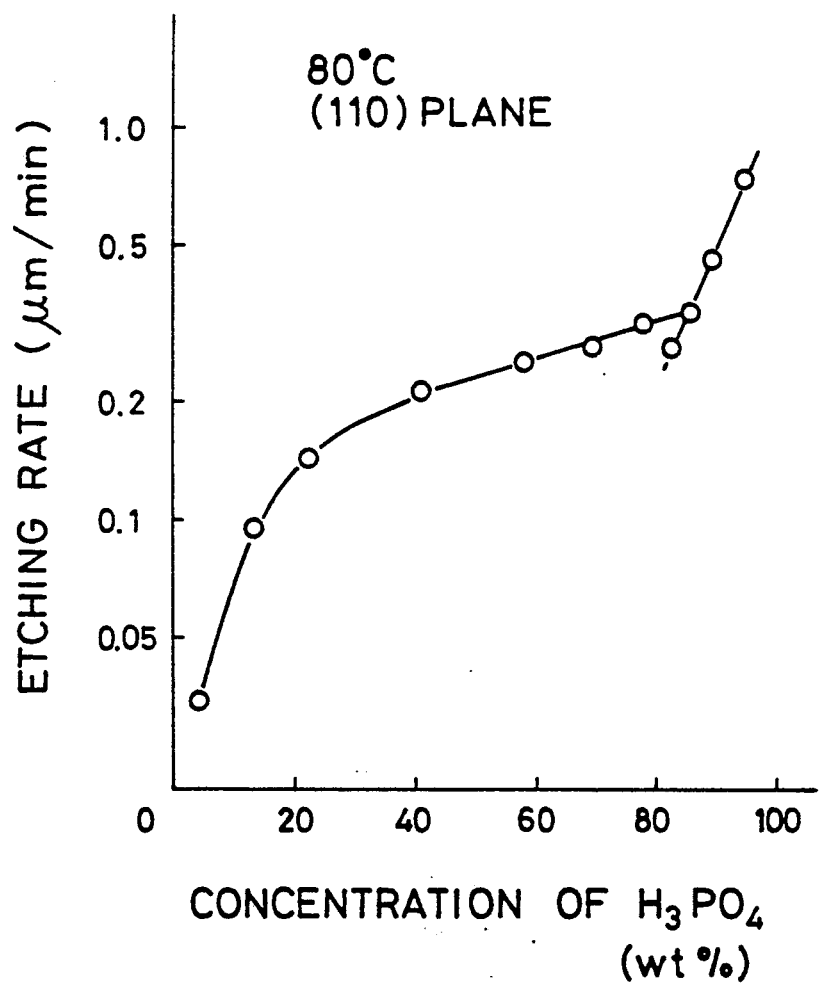
FIG. 6 is a graph showing a relationship between the concentration of an aqueous solution of phosphoric acid and the etching speed.
Figure 7:
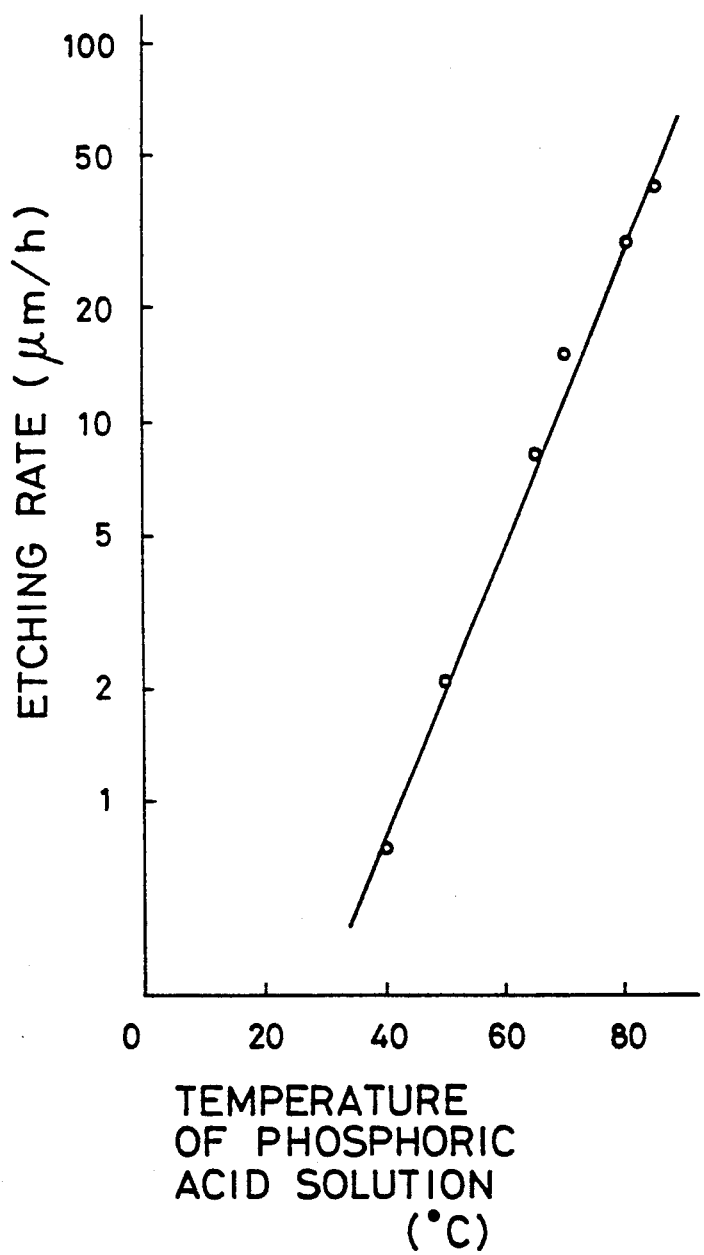
FIG. 7 is a graph showing a relationship between the temperature of the phosphoric acid solution and the etching speed.

The ferrite block including the ferrite single crystal provided with the etching mask 11 is then immersed in an aqueous acid solution containing phosphoric acid as a major portion of the acid solute, so that the surface of the ferrite single crystal which gives the operating surface of the magnetic head slider 7 is chemically etched through the etching mask 11. The etching speed of the ferrite single crystal has specific relationships with the acid concentration and the temperature of the acid solution, as indicated in FIGS. 6 and 7, respectively. If the ferrite single crystal is kept in the acid solution for a long time, a resin such as a photoresist used as the masking material tends to swell, whereby the adhesive force of the mask 11 tends to be reduced. In this respect, the etching time is desirably as short as possible. While the concentration and temperature of the phosphoric acid solution are selected depending upon the desired depth of etching, it is preferred that the concentration of the phosphoric acid solution is kept within a range of 10–85% and that the temperature of the solution is kept within a range of 40°–90° C. If the acid concentration of the solution is lower than 10%, the etching speed is excessively low. If the acid concentration is higher than 85%, the etching speed is sufficiently high, but the viscosity of the acid solution is too high to assure satisfactory etching accuracy. If the temperature of the acid solution exceeds 90° C., the solution undergoes a high rate of evaporation of the aqueous component and a considerable change in the concentration. Further, it is difficult to control the temperature of the acid solution. If the temperature is lower than 40° C., the etching speed is not sufficiently high.

The aqueous acid solution containing phosphoric acid as a major component as the solute is interpreted to mean either an aqueous solution whose solute consists solely of phosphoric acid, or an aqueous solution which contains a trace amount of other acid or acids such as sulfuric acid in addition to phosphoric acid used as major portion of the solute. The term "major portion" used herein of the solute is interpreted to mean at least 80% of the total amount of the acids contained in the aqueous solution.

While the method of the present invention is applied to the production of a negative-pressure type magnetic head slider, the instant method is equally effective for forming track portions of a magnetic head, owing to the excellent features of the method that permit an etched inclined surface to have an angle of inclination of 60° or larger and high dimensional accuracy, as described above.

It is to be understood that the present invention may be embodied with various changes, modifications and improvements, which may occur to those skilled in the art, in the light of the foregoing description and the following examples of the present invention. The following examples are provided for illustrative purposes only, and it is to be understood that the invention is not limited to the details of the examples:

EXAMPLE 1

Various Mn-Zn ferrite single crystals each consisting of 53 mole % of $Fe_2O_3$, 30 mole % of MnO and 17 mole % of ZnO were lapped or mirror-polished, each at a surface thereof which provides an operating surface of the magnetic head slider to be produced. The specimen crystals had different crystal orientations with respect to the lapped surface (sliding surface of the head slider), as indicated in Table 2. The lapping was effected in an ordinary manner by using a diamond abrasive having a grain size of ¼ μm. The lapped surfaces of the specimens had a roughness value of Rmax 0.02 μm or lower.

Then, the specimens, i.e., the ferrite single, were kept for 15 minutes in an aqueous solution of $(1+10)H_3PO_4$ having a temperature of 50° C., so that the lapped surface of each specimen was etched by an amount of 1000 angstroms. Then, the specimens were annealed at 400° C. for 30 minutes in an atmosphere of $N_2$ (oxygen concentration < 30 ppm).

Subsequently, a photoresist was applied to the thus treated surface of each specimen, by photolithography under the conditions indicated in Table 1, to form an etching mask which covers the portions of the treated surface of the specimen that correspond to the air-bearing portions 1, 1 and the cross rail 2 of the negative-pressure type magnetic head slider 7 as shown in FIG. 1.

TABLE 1

| | |
|---|---|
| Photoresist | OFPR800 * |
| Photoresist thickness | 1.5 μm |
| Pre-baking | 85° C. × 30 minutes |
| Exposure | 200 mJ/cm² |
| Development | 23° C. × 60 seconds |

TABLE 1-continued

| | |
|---|---|
| Post-baking | 140° C. × 30 minutes |

* Available from TOKYO OUKA KABUSHIKI KAISHA, Japan

Then, each specimen having the etching mask was immersed in an aqueous solution of phosphoric acid ($H_3PO_4$) having 77.8 wt. % concentration and a temperature of 80° C., and was thus subjected to a chemical etching operation for 30 minutes while the solution was stirred. As a result, the operating surface (1, 2, 3) of the magnetic head slider 7 was formed by the chemical etching, with the pressure-reducing portion 3 having a depth of 10 μm.

The specimens having the different crystal orientations were evaluated in terms of the angles of inclination of the shoulder surfaces 5 of the cross rail 2 and the shoulder surfaces 6 of the air-bearing portions 1, the accuracy of width of the air-bearing portions 1, and the surface roughness of the pressure-reducing portion 3. The measurements are indicated in Table 2.

TABLE 2

| Crystal Orientation | | | Inclination Angle *4 | | Width Accuracy (μm) *5 | Surface Roughness (μm) *6 |
|---|---|---|---|---|---|---|
| Top *1 | Side *2 | Cross *3 | Cross Rail | Air-Bearing Surface | | |
| (110) | (110) | (100) | 35° 35° | 65° 65° | ±0.5 | 0.05 |
| (110) | (100) | (110) | 65° 65° | 35° 35° | ±1.6 | 0.05 |
| (110) | (111) | (211) | 70° 70° | 76° 76° | ±0.7 | 0.05 |
| (110) | (211) | (111) | 76° 76° | 70° 70° | ±0.6 | 0.05 |
| (100) | (110) | (110) | 53° 53° | 53° 53° | ±1.3 | 0.1 |
| (100) | (100) | (100) | 70° 70° | 70° 70° | ±1.0 | 0.1 |
| (210) | (100) | (210) | 70° 70° | 70° 70° | ±0.9 | 0.08 |
| (211) | (110) | (111) | 25° 76° | 60° 60° | ±0.7 | 0.07 |
| (211) | (111) | (110) | 60° 60° | 25° 76° | ±0.7 | 0.07 |
| (311) | (110) | (332) | 40° 65° | 60° 60° | ±0.7 | 0.07 |

*1: Top or operating surface including cross rail 2 and air-bearing portions 1
*2: Side surface parallel to the direction of extension of the air-bearing portions 1 and perpendicular to the operating surface
*3: Cross surface parallel to the direction of extension of the cross rail 2 and perpendicular to the operating surface
*4: Inclination of angles of shoulder surfaces 5, 6 defining the width of the cross rail 2 or air-bearing portion 1
*5: Width accuracy of air-bearing portions 1
*6: Surface roughness of the pressure-reducing portion 3

It will be understood from the results of measurement of Table 2 that the produced specimens of the negative-pressure type magnetic head slider were comparatively excellent in the inclination angle of the shoulder surfaces 5, 6 of the cross rail 2 and air-bearing portions 1, width accuracy of the air-bearing portions 1, and surface roughness of the pressure-reducing portion 3, in the case where the top or operating surface (1, 2, 3) of the head slider 7, the side surface which is parallel to the longitudinal direction of the air-bearing portions 1 and perpendicular to the top surface, and the cross surface which is perpendicular to the longitudinal direction of the air-bearing portions 1 and perpendicular to the top surface are provided by respective crystal faces which are selected from the following six combinations:

| | Top or Operating Surface | Side Surface | Cross Surface |
|---|---|---|---|
| 1) | (110) | (111) | (211) |
| 2) | (110) | (211) | (111) |
| 3) | (100) | (100) | (100) |
| 4) | (210) | (100) | (210) |
| 5) | (211) | (110) | (111) |
| 6) | (311) | (110) | (332) |

EXAMPLE 2

Figure 8A:
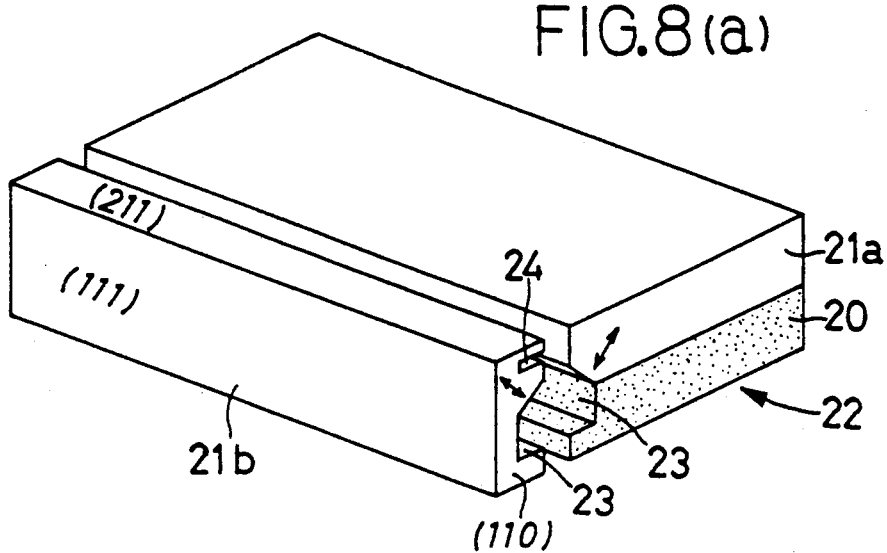
FIGS. 8(a) through 8(e) are views illustrating process steps of one example of a method of the invention for producing a negative-pressure type magnetic head slider.

A composite ferrite block 22 as indicated in FIG. 8(a) was prepared by bonding together a Mn-Zn ferrite polycrystal 20 (having the same composition as the ferrite used in Example 1) and a Mn-Zn ferrite single crystal 21a (having the same composition as the ferrite polycrystal 20) whose crystallographic orientation is determined such that the operating, side and cross surfaces of a head slider to be prepared are provided by crystal faces (211), (110) and (111), respectively. The bonding was effected by a known solid-solid reaction bonding technique. The composite ferrite block 22, and another ferrite single crystal 21b were subjected to operations to form grooves 23 which cooperate to define a coil-winding aperture in a magnetic head to be produced. The ferrite single crystal 21b was also provided with a glass filler groove 24. Further, the surfaces of the ferrite single crystals 21a and 21b which cooperate to define a magnetic gap 25 were subjected to a chemical etching operation to a depth which corresponds to the desired amount of the gap 25. This chemical etching was effected by using an aqueous solution of phosphoric acid.

Figure 8B:
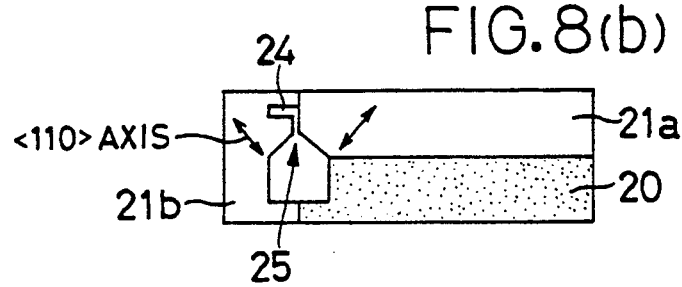
Figure 8C:
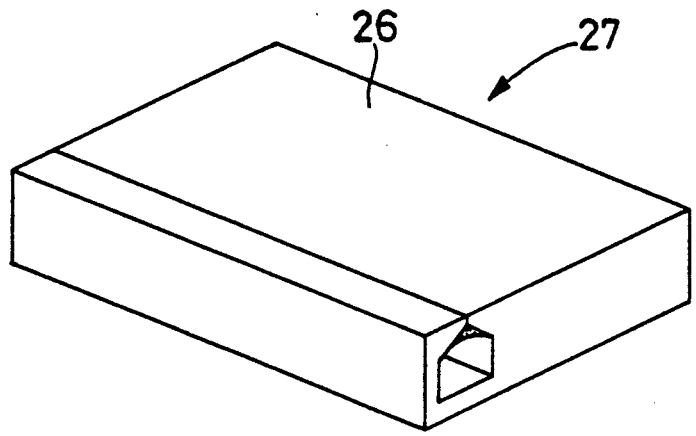
Figure 8D:
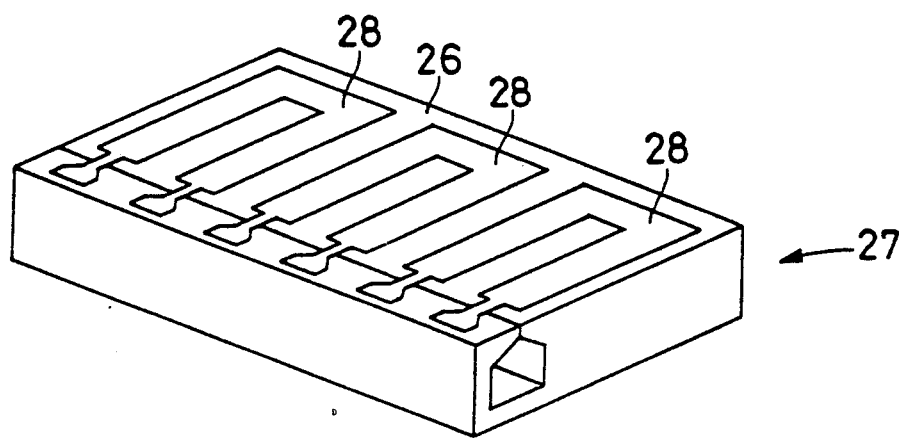

Then, the composite ferrite block 22 and the ferrite single crystal 21b were bonded together by a solid-solid reaction bonding technique, such that the <110> directions of the two crystals were oriented, as indicated in FIG. 8(b). The magnetic gap 25 of the bonded ferrite block 20, 21a, 21b was then filled with a glass material as a non-magnetic material. Subsequently, the top surface of the ferrite block in which the magnetic gap 25 was open was ground so that the depth of the magnetic gap 25 (in the direction perpendicular to the ground surface) was reduced to 8 μm. The ground surface was finally lapped with a diamond abrasive having a grain size of ¼ μm. Thus, there was prepared a ferrite bar 27 having a finished top surface 26 as shown in FIG. 8(c). The top surface 26 provides the operating or sliding surface of each of a plurality of magnetic head sliders to be produced.

The thus prepared ferrite bar was annealed at 400° C. for 30 minutes in an atmosphere of $N_2$, and was cleaned by ultrasonic waves in an aqueous solution of ethanol amine having a 20% concentration and a temperature of 25° C.

Subsequently, etching masks 28 were formed on the top surface 26 of the ferrite bar 27, by applying a photoresist by photolithography under the same condition as indicated in Table 1. Each etching mask 28 corresponds to each magnetic head slider to be produced from the ferrite bar 27.

Figure 8E:
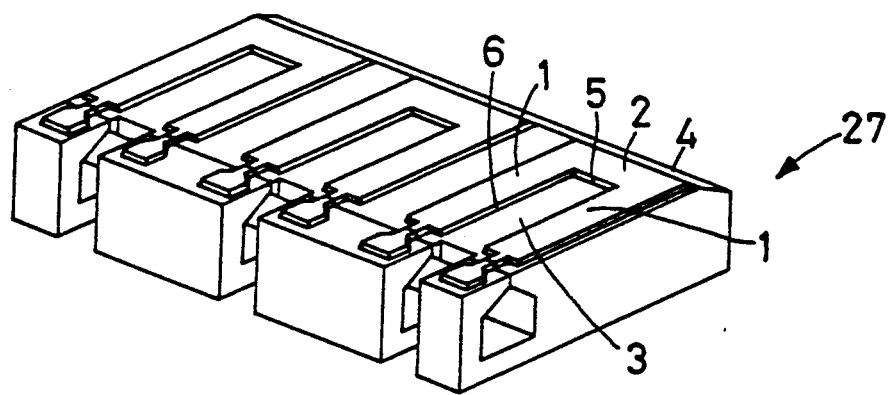

The top surface 26 with the etching masks 28 was chemically etched for 30 minutes within the same aqueous solution of phosphoric acid under the same condition as in Example 1, while the solution was stirred. As a result, the top surface 26 was formed with the air-bearing portions 1, 1, the cross rail 2, and the pressure-reducing portion 3, as shown in FIG. 8(e), such that the pressure-reducing portion 3 has a depth of 10 μm as measured from the top surfaces of the air-bearing portions 1 and cross rail 2. The ferrite bar 27 was further subjected to an operation to form the inclined surface 4 at one end of the bar corresponding to the air inlet side of each magnetic head slider to be produced, and to an operation to form yoke portions of the magnetic head which include the read/write tracks. The ferrite bar 27 was then cut into the bulk type negative-pressure type magnetic head sliders, as shown in FIG. 4(b).

The shoulder surface 5 between the cross rail 2 and the pressure-reducing portion 3 had an inclination angle of 76°, and the shoulder surfaces 6 defining the width of each air-bearing portion 1 and the pressure-reducing portion 3 had an inclination angle of 60°. The width accuracy of the read/write tracks, as well as the width accuracy of the air-bearing portions 1, was held to within ±0.7 μm.

The negative-pressure type magnetic head sliders which were produced according to the method of this invention exhibited excellent reading and writing characteristics, a reading output of 45 dB or higher, irrespective of a relatively small etching depth of 10 μm (as measured from the sliding surface of the tracks to the etched surface of the pressure-reducing portion 3), and irrespective of some influences of the etched ferrite surface and various sorts of noises. These excellent information reading characteristics are considered to result from the 8 μm depth of the magnetic gap 25 and from the sufficiently large inclination angle of 60° of the shoulder surfaces which define the width of each track. Further, the produced magnetic head sliders exhibited over-writing characteristics of 37 dB or higher where information was written on previously recorded tracks of a magnetic disk.

The present method requires a considerably reduced time for processing a ferrite block or bar to produce negative-pressure type magnetic head sliders, namely, about one tenth or less of the processing time required in the conventional method which uses an argon ion sputtering technique. Accordingly, the present method permits economical production of the magnetic head sliders, in a considerably simplified manner and without an investment in the conventionally required equipment.

The magnetic head slider produced according to the present invention is characterized by the use of a ferrite single crystal for providing at least the operating surface of the head slider which is adapted to face the recording medium. The crystal faces of the ferrite single crystal are oriented such that the (111) plane of the crystal is a plane other than a plane which is parallel to the extension of the downstream edge line of the cross rail, or such that the (111) plane is parallel to the extension of the downstream edge line of the cross rail and is inclined at an angle of at least 60° with respect to the operating surface. This arrangement permits the shoulder surface between the cross rail and the pressure-reducing portion to be formed at a sufficiently large angle, thereby enabling the pressure-reducing portion to cooperate with the air-bearing portions, for stably maintaining the desired amount of flying height between the head slider and the surface of a magnetic recording medium. Further, the magnetic head slider may be comparatively easily produced, by forming an etching mask on a ferrite block or bar by photolithography, and subjecting the ferrite block or bar to a chemical etching using an aqueous acid solution containing phosphoric acid as a major component of the acid solute. The angle of inclination of the shoulder surfaces which define each air-bearing portion may desirably be made sufficiently large, by selecting one of the following combinations of crystal faces of the ferrite single crystal used, as the first plane parallel to the operating surface of the magnetic head slider which faces the surface of the magnetic recording medium, the second plane parallel to a surface which is perpendicular to the operating surface and parallel to the extension of the downstream edge line of the air-bearing portions, and the third plane parallel to a surface which is perpendicular to the operating surface and parallel to the extension of the downstream edge line of the cross rail: (211), (110) and (111); (311), (110) and (332); (110), (111) and (211); (110), (211) and (111); (100), (100) and (100); and (210), (100) and (210). This selection of the crystal faces is also effective to improve the accuracy of controlling the width of each air-bearing portion.

The time required for the chemical etching according to the method of the present invention is about one tenth of that required in the conventional ion etching method, which requires comparatively expensive ion etching equipment. Moreover, the present method does not require the use of a metallic etching mask made of a metallic material such as Cr and Ti, which complicates the mask patterning process.

In the present method which uses a ferrite single crystal for at least the operating surface of the magnetic head slider, the surface roughness of the pressure-reducing portion of the head slider may be held to Rmax 0.1 μm or less. This significantly contributes to improvement in the operating stability of the magnetic head slider, in terms of the amount of flying height maintained between the head slider and the recording medium.

Where the present method is applied to forming the tracks of the magnetic head, the accuracy of the width of the tracks may be held to within ±0.1 μm, thereby contributing to an improvement in the information recording density per unit area of the magnetic recording medium. Further, if the present method is applied to the tracks, the shoulder surfaces defining the width of each track may be made 60° or larger, which is effective to improvements in the stability of maintaining the desired flying height of the head slider to the recording medium, and in the magnetic characteristics of the head.

What is claimed is:

1. A method of producing a negative-pressure type magnetic head slider having an operating surface which faces a surface of a magnetic recording medium, and on which are formed an inclined portion for introducing an air stream into an air-bearing clearance between the operating surface of the head slider and the surface of the recording medium, a pair of mutually spaced-apart parallel air-bearing portions extending in a direction of flow of the air stream and functioning to cause the air stream to hold the head slider away from the surface of the recording medium, a cross rail extending between said air-bearing portions and functioning to reduce a rate of flow of the air stream, and a pressure-reducing portion formed between said air-bearing portions and downstream of said cross rail in the direction of flow of the air stream and cooperating with said cross rail to reduce a pressure of the air stream for thereby causing the head slider to be attracted toward the surface of the recording medium, the method comprising the steps of:

preparing a ferrite single crystal which provides at least said operating surface of the head slider;

forming an etching mask on an etching surface of said ferrite single crystal, said etching mask including a first portion and second portions which cover respective portions of said etching surface which correspond to said cross rail and said air-bearing portions, respectively, said etching surface being selected and crystal faces of said ferrite single crystal being determined such that the (111) plane of said ferrite single crystal is a plane other than a plane which is parallel to the extension of a downstream edge line of said first portion of said etching mask as viewed in a direction of flow of the air stream, or such that said (111) plane is parallel to said extension of said downstream edge line of said first portion of said etching mask and is inclined at an angle of at least 60° with respect to said etching surface; and chemically etching said etching surface of said ferrite single crystal with an aqueous acid solution containing phosphoric acid as a major acid component, to thereby form said operating surface of said magnetic head slider which has at least said air-bearing portions, said cross rail and said pressure-reducing portion, each of said air-bearing portions and said cross rail having two inclined shoulder surfaces which define a width thereof.

2. A method according to claim 1, wherein said crystal faces of said ferrite single crystal are determined such that a combination of a first plane parallel to said etching surface, a second plane parallel to the extension of said second portions of said etching mask and perpendicular to said etching surface, and a third plane parallel to said extension of said downstream edge line of said first portion of said etching mask and perpendicular to said etching surface is selected from the group consisting of the following combinations of planes: (211), (110) and (111); (311), (110) and (332); (110), (111) and (211); (110), (211) and (111); (100), (100) and (100); and (210), (100) and (210).

3. A method according to claim 1, wherein said aqueous acid solution has a concentration of 10-85 wt. %.

4. A method according to claim 1, wherein a temperature of said aqueous acid solution is within a range of 40°-90° C.

5. A method according to claim 1, wherein said etching mask is formed of a photoresist by photolithography.

6. A method according to claim 1, further comprising lapping said etching surface of said ferrite single crystal before said etching mask is formed on said etching surface.

7. A method according to claim 1, further comprising preliminarily treating said etching surface with an aqueous acid solution before said etching mask is formed on said etching surface.

8. A method according to claim 1, further comprising annealing said ferrite single crystal in an inert gas before said etching mask is formed on said etching surface.

* * * * *

UNITED STATES PATENT AND TRADEMARK OFFICE
CERTIFICATE OF CORRECTION

PATENT NO. : 5,104,483

DATED : April 14, 1992

INVENTOR(S) : Takeya

It is certified that error appears in the above-identified patent and that said Letters Patent is hereby corrected as shown below:

On the title page, item [56]:

Under "References Cited", the "U.S. PATENT DOCUMENTS" section change "4,878,004" to --4,787,004--.

Signed and Sealed this

Sixth Day of October, 1992

Attest:

DOUGLAS B. COMER

*Attesting Officer*    *Acting Commissioner of Patents and Trademarks*